(12) United States Patent
Breaux et al.

(10) Patent No.: US 8,190,579 B2
(45) Date of Patent: May 29, 2012

(54) IMS CHANGE MAPPER

(75) Inventors: Ed Breaux, Katy, TX (US); Gary Salazar, Sugar Land, TX (US); Martin Warnica, Sugar Land, TX (US)

(73) Assignee: BMC Software, Inc., Houston, TX (US)

( * ) Notice: Subject to any disclaimer, the term of this patent is extended or adjusted under 35 U.S.C. 154(b) by 436 days.

(21) Appl. No.: 12/134,639

(22) Filed: Jun. 6, 2008

(65) Prior Publication Data

US 2009/0307272 A1    Dec. 10, 2009

(51) Int. Cl.
*G06F 17/00* (2006.01)
(52) U.S. Cl. ......... 707/672; 707/627; 707/982; 707/688
(58) Field of Classification Search .................. 707/609, 707/636, 660–668, 672–677, 687–688, 627, 707/682; 702/182–187; 709/202–204, 215–218; 705/1, 7
See application file for complete search history.

(56) References Cited

U.S. PATENT DOCUMENTS

| | | | | |
|---|---|---|---|---|
| 6,202,071 | B1 * | 3/2001 | Keene | 1/1 |
| 6,718,358 | B1 * | 4/2004 | Bigus et al. | 718/100 |
| 6,804,627 | B1 * | 10/2004 | Marokhovsky et al. | 702/182 |
| 6,985,901 | B1 * | 1/2006 | Sachse et al. | 1/1 |
| 7,031,981 | B1 * | 4/2006 | DeLuca et al. | 1/1 |
| 2002/0138762 | A1 * | 9/2002 | Horne | 713/201 |
| 2002/0184366 | A1 * | 12/2002 | Kimoto et al. | 709/224 |
| 2003/0056116 | A1 * | 3/2003 | Bunker et al. | 713/201 |
| 2003/0088579 | A1 * | 5/2003 | Brown et al. | 707/104.1 |
| 2004/0034643 | A1 * | 2/2004 | Bonner et al. | 707/100 |
| 2005/0086263 | A1 * | 4/2005 | Ngai et al. | 707/104.1 |
| 2005/0108199 | A1 * | 5/2005 | Ellis et al. | 707/2 |
| 2005/0223046 | A1 * | 10/2005 | Smith | 707/200 |
| 2005/0234900 | A1 * | 10/2005 | Bossman et al. | 707/4 |
| 2006/0047684 | A1 * | 3/2006 | Cherkauer | 707/102 |
| 2006/0059205 | A1 * | 3/2006 | Shah et al. | 707/200 |
| 2006/0161387 | A1 * | 7/2006 | Jowett et al. | 702/182 |
| 2006/0184498 | A1 * | 8/2006 | Meyer et al. | 707/1 |
| 2006/0218128 | A1 * | 9/2006 | Muras | 707/3 |
| 2007/0143314 | A1 * | 6/2007 | Thomsen | 707/100 |
| 2007/0162426 | A1 * | 7/2007 | Brown et al. | 707/2 |
| 2007/0282837 | A1 * | 12/2007 | Klein | 707/7 |
| 2008/0120349 | A1 * | 5/2008 | Kim et al. | 707/202 |

FOREIGN PATENT DOCUMENTS

| EP | 1035483 | * | 9/2000 |
|---|---|---|---|
| EP | 2290562 | * | 3/2011 |

OTHER PUBLICATIONS

John N. Wilson et al. "Extracting Partition Statistics from Semistructured Data",Proceedings of the 17th International Conference on Database and Expert Systems Applications (DEXA'06), 2006, 1-5 pages.*
Jim Melton, "Chapter 11—Active Databases and Triggers",SQL: 1999-1999 Understanding Relational Language Components,2002, pp. 395-410.*

* cited by examiner

*Primary Examiner* — Srirama Channavajjala

(57) ABSTRACT

A method, system and device for monitoring internal database log events in a computer database environment are described. As database updates are detected they are analyzed and used to determine which of several kinds of database maintenance are required. The database administrator is therefore presented with information to allow for more accurate maintenance scheduling and able to prevent unnecessary database maintenance outages.

28 Claims, 2 Drawing Sheets

IMS CHANGE MAPPER

BACKGROUND

The invention relates generally to methods and systems to reduce database maintenance. More particularly but not by way of limitation, to a method and system for identifying changed database records by monitoring internal database information to determine which maintenance utilities are necessary to run. Thereby a schedule and focus of maintenance functions may be identified to optimize database maintenance.

Information Management Systems (IMS), available from International Business Machines Corporation, provides a robust environment in which multiple users may have concurrent access to data for use by multiple application programs. Maintenance primarily consists of backing up the data and information required to recover a database should some type of failure occur and a facility to reorganize the database to assure optimal access to the data. Backup processing (image copy) is required periodically so that should a recovery be required, there will be a recent copy of the data to start with prior to the event. Logging maintenance is required to capture, store and register all the changes that occur to the database during application program processing. Database updates captured on the logs will be applied to the image copy to reproduce a database should a failure occur. Finally, database reorganizations optimize access to the data contained in the database that over time becomes disorganized (fragmentation of a database record) due to the update activity that occurs after the last database reorganization.

SUMMARY

Change Mapper for IMS discloses a system and method to monitor IMS logs (user selectable: real time or during archive), identifying changed database records, recording changes for future analysis, and then based on user defined change activity thresholds, triggers action(s). This provides a real time view of all database change activity without requiring a scan of any database datasets, allowing the user (e.g., Database Administrator) to schedule database maintenance for the entire database or a subset based on the analysis of IMS Log content.

In one embodiment the invention provides for building an initial change map from an already optimized database and monitoring the log records produced by IMS when processing a job or transaction. Analysis of each created log record is performed via an exit call provided in the IMS logger module, thereby providing information about internal activity in the databases for immediate analysis.

In a further embodiment the invention provides for monitoring the log records via an exit call provided in the IMS log archive module. IMS archives the log records periodically and thus near real-time information and analysis may be obtained in this embodiment.

DETAILED DESCRIPTION

Figure 1:
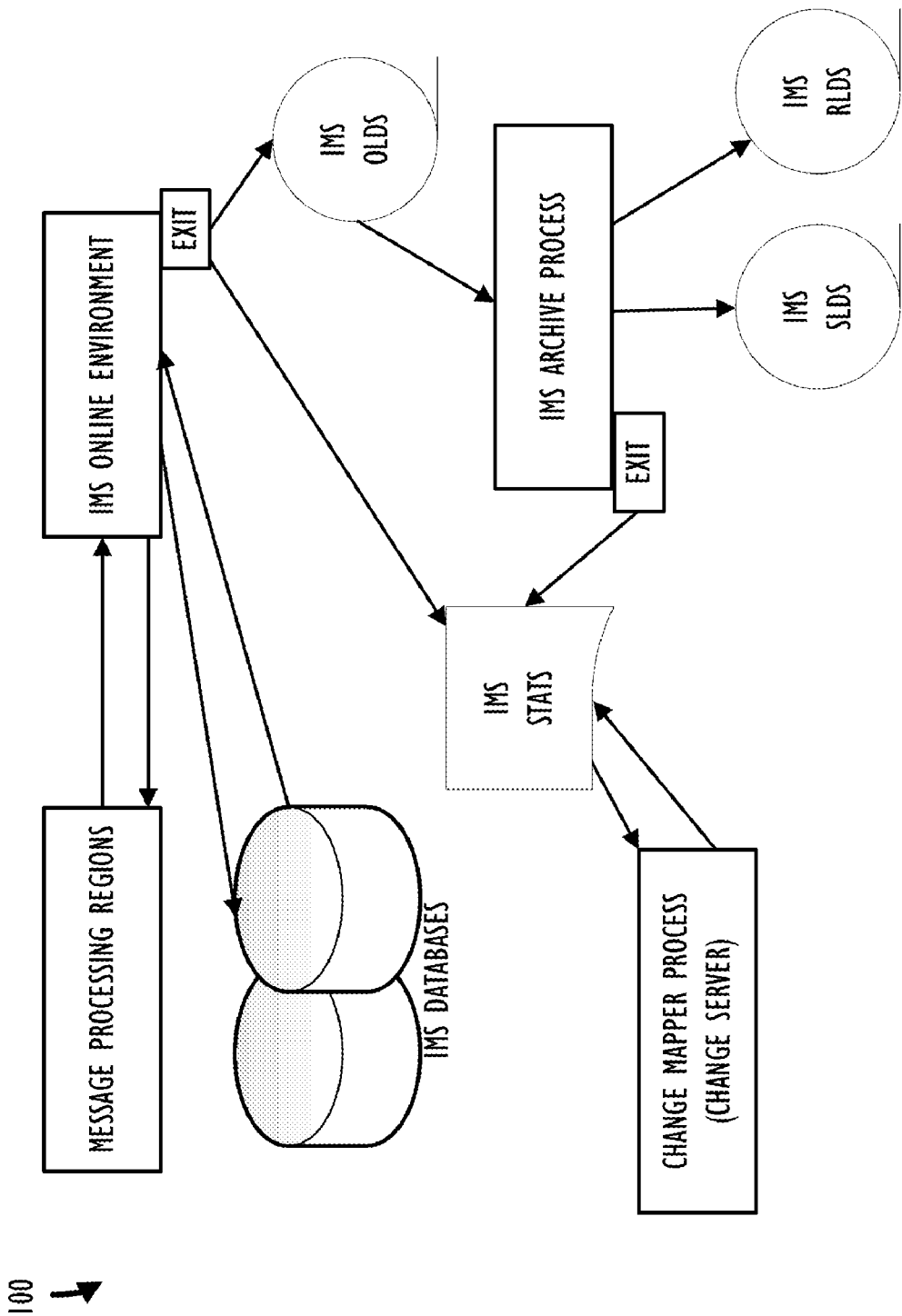
FIG. 1 shows an illustrative database computing environment.

The instant disclosure describes various embodiments for use in managing database maintenance via a change server process and a change map. The change map records the monitored changes in a structure to facilitate "mapping" the changes back to the area of the database that was changed via database activity. The change server process uses this mapped data to perform analysis. By way of example, not intended to limit the scope of the claimed invention, the instant disclosure describes a particular embodiment of managing database maintenance in the context of an IMS database. It should be recognized that the methods and systems described herein may be applicable to other types of data management including but not limited to relational databases, disk management and generally to any large repository of data (e.g., data warehouse).

To keep applications running and provide for the ability to recover a database, periodic maintenance is required. The types of maintenance include, but are not limited to, database reorganizations, image backups and log management. Database reorganizations may be performed to ensure that access to a database is optimized. This improves overall application performance, making sure business services are working within expected service levels. Periodically, the user (e.g., database administrator or "DBA" typically determines if it is necessary to reorganize their databases. The process for determination may include running a utility that reads the entire database and produces statistics on the extent of database fragmentation. Statistics may then be used to determine if database reorganization is necessary. If reorganization is needed, the statistics may also be used to make changes to the database design and/or size of the database. Because the resources required to monitor the large number of databases may exceed available staffing, an alternative method is to simply schedule periodic (e.g., weekly) reorganizations of all databases.

Performing database reorganization may require taking the database off-line so that the data may be rearranged in the database to place all data specific to each database record in contiguous storage and eliminate fragmentation that occurs over time. Assigning a DBA to manually run utilities to determine which databases require reorganization is time consuming and expensive. Blindly performing reorganizations based on a specific time period may also impact the business function because the system may not be available to support the business when the maintenance is being performed. The instant invention eliminates inefficient and costly maintenance that may be performed when little to no update activity exists against those databases since the prior reorganization.

IMS database backup management is typically performed by creating a "batch" image copy that can be used as a recovery point. Again, the database is taken away from the applications (i.e. off-line) and a copy of the database is made by reading the database sequentially and copying all the data in the database to a sequential file called an image copy. During this copy process, the database is unavailable to all applications wishing to access data from that database. As with reorganization, this means that critical business applications may be shut down and unavailable during the process.

IMS log management is required to provide complete recoverability of data. All updates to databases are recorded in an IMS log dataset. Log records used in conjunction with an image copy may provide that a database can be restored with all updates to the current time. To reduce the number of logs maintained for recovery purposes, a Change Accumulation utility may be provided that merges log data for a database. Thus, eliminating all but the last update a specific data occurrence. The Change Accumulation dataset may be kept instead of all the log datasets and used to recover a specific database.

Over time, the process for recovering a database to current state can become lengthy due to the number of captured database updates from the entire log input. When lots of log data exists, a Change Accumulation process can reduce the amount of data that must be processed for recovery purposes to a manageable amount of data by eliminating all but the last committed update to a database location. Over time, even the amount of Change Accumulation data can become excessive, causing lengthy database recovery times. At this point, a database image copy can eliminate the need to maintain the logs and Change Accumulation data with timestamps prior to the new image copy timestamp. Again, keeping track of when it is necessary to run a Change Accumulation process and when it is necessary to run an image copy process can be extremely time consuming to monitor, so typically each is simply put on a periodic schedule, whether one is needed or not. The result is database availability outages that may have been unnecessary.

Reduce cost via log analysis (change mapper)—One of ordinary skill in the art, given the benefit of this disclosure, will understand that many times redundant processes are performed because there has been little to no change (updates) to a database. Because IMS logs all database updates in their logger component, it would be novel to create a portal into the logger, as shown in system environment 100 of FIG. 1, that would be useful in determining when databases actually require a specific type of maintenance and to be able to predict and plan that maintenance.

Log records produced by the IMS logger component contain information about many aspects of the activity in an IMS environment. For example, the "X50" type log record captures all types of database updates. These log records show all forms of updates: data insertion, data updates and data deletion. This data may be analyzed further to help identify when certain activities are needed.

There are several locations in the IMS logger that provide a view of the log data. Typically online IMSTM systems (an IMS control region that manages both online transactions and batch message processing regions) and DBCTL systems (an IMS control region that manages batch message processing regions only) utilize a log archive process that copies log data to a secure spot for future processing. By exploiting the log archive exit, the instant invention may gain access to the log records of interest and produce a historical file of statistics and a file containing the list of databases for which maintenance is required based on a set of defined thresholds being exceeded (trigger file). The trigger file can be used by various maintenance utilities to determine on what objects and what actions on those object need to be taken.

By reviewing the IMS database update log records it is possible to identify which databases have updates against them and using that information, determine which utilities are necessary to run. In addition these utilities, when capable, may be given more detailed information and act only on areas of the database that are fragmented.

Therefore, instead of running redundant processes against databases that have had little to no update activity, it can be determined which databases have had update activity and even determine the extent of database update activity. Analysis routines may also access the volumes of log data and produce a smaller statistics file and a database trigger file for the purpose of scheduling specific types of database maintenance at appropriate times.

In a preferred embodiment, these utilities would integrate with existing database utilities such as BMC IMS Backup and Recovery utilities and BMC Database Performance utilities, both provided by BMC Software inc., to use the gathered statistics to automate/schedule their use. The dynamically gathered data may also be stored and, in addition to providing for maintenance information, could be used to determine design, sizing, and/or parameter settings for the database, and also be used to produce database usage patterns.

Figure 2:
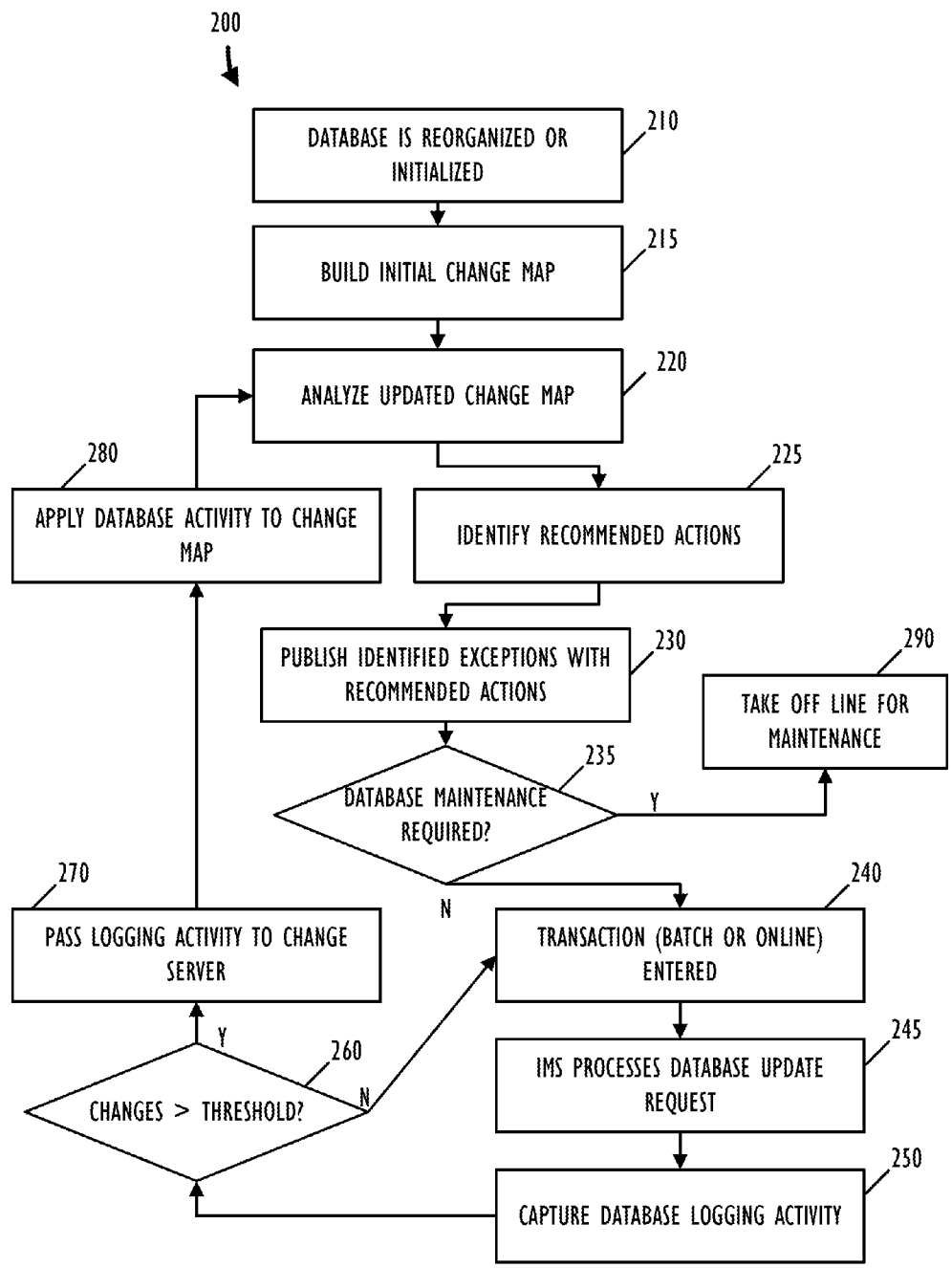
FIG. 2 shows, in flowchart form, an illustrative monitoring process.

Referring now to FIG. 2, initially the database is reorganized to its optimal state with minimal to no fragmentation (Box 210). Change map is initialized with information about the database (Box 215). At box 220 the process enters a first loop where the change map is analyzed whenever it is updated. Analysis identifies recommended actions for maintenance of the database (Box 225) and allows for publishing identified exceptions and recommended actions (Box 230). Publishing can consist of presenting these actions or exceptions to a DBA or for automation of other database utilities. Database maintenance requirements are determined at box 235 and if off-line maintenance is required flow progresses to box 290 where the database is taken off-line for required maintenance.

Boxes 240, 245, 250 and 260 represent an inner loop for an iterative sub-process that continues for the duration of the job or system started at box 240. Box 240 represents starting an IMS batch job or online IMS system. The process monitors update log records as they are created automatically by IMS when processing the database update request (box 245). As part of normal processing, user transactions produce application DL/1 calls that generate change activity for IMS databases. Capturing the database logging activity (box 250) allows analysis of the database updates that were generated in response to the DL/1 call. From log record content, database specific information about the update can be gathered for later analysis by the change server. Typical types of information gathered include: updated database(s), relative block number within the database dataset, offset of update within the block, block formatting (database extension), and other information which may be determined from the updated data visible in the log record. This other information includes but is not limited too, type of update (e.g., insert, delete, replace), and if the update was contained within the original block or has spilled over into multiple blocks.

At job/system termination or on some pre-determined cycle or threshold crossing (YES prong of box 260) the second inner loop is terminated and data is passed to change server (box 270) for inclusion in the change map (box 280). During this second inner loop changes may be stored in a buffer or cache to limit the amount of processing performed by the change server. At this point a data store is available for access by other processes. The data store contains a picture of change activity for the databases in the enterprise database environment. Change map is again analyzed (box 220) to identify recommended actions (box 225) based on the changes that have taken place since the last analysis and the cumulative changes since the database was last reorganized or initialized.

On delivery of new data, change server analyzes changes at box 280 and box 220 to make appropriate updates to change map. Change map is now available for external processing to determine if database maintenance is required. Change server analysis may include, inter alia: % change in record size, % change in number of blocks the record occupies, change in fragmentation (i.e. have new blocks been acquired or have old blocks been freed), % change in freespace and % change in record count.

Information gathered by the above process may be performed in a number of ways. For example, information could be gathered in real-time during actual IMS logging process.

Alternatively, information could be gathered in near real-time by performing analysis during IMS log archive processing.

The description above is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Various changes in the details of the illustrated operational methods are possible without departing from the scope of the following claims. For instance, illustrative monitoring process 200 may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIG. 2 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices, sometimes referred to as computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

What is claimed is:

1. A method of monitoring internal activity within one or more databases comprising:
    tracking updates to one or more database segments in the one or more databases based on log record information associated with each of the databases, wherein the log record information identifies a type of update, a location of the update within the database and the database in which the update occurred;
    accessing the log record information using a portal to a logger component of the databases;
    generating metrics using the accessed log record information including fragmentation metrics and update metrics, wherein the fragmentation metrics include statistics of an extent of database fragmentation and the update metrics include statistics of an extent of changes to a database;
    storing the fragmentation metrics and the update metrics in a change map;
    analyzing the fragmentation metrics and the update metrics stored in the change map to determine database maintenance requirements by comparing the fragmentation metrics and the update metrics to pre-defined thresholds set in a trigger file to determine when to perform one or more database utilities; and
    publishing the database maintenance requirements based on analysis of the metrics.

2. The method of claim 1 wherein the act of publishing further comprises presenting one or more recommended actions to a database administrator.

3. The method of claim 1 wherein the act of publishing further comprises causing another process to automatically perform one or more recommended actions.

4. The method of claim 1 wherein the act of analyzing further comprises analyzing a change map containing information about database updates over a period of time.

5. The method of claim 1 wherein the act of analyzing is performed in real-time.

6. The method of claim 1 wherein the act of analyzing is performed in near real-time.

7. The method of claim 1 wherein the act of analyzing is performed for a specific time period.

8. The method of claim 1 wherein the act of analyzing is performed by a change server process implemented via an internal exit function provided by a database logging function.

9. The method of claim 8 wherein the tracked updates are buffered until a threshold is reached prior to performing analysis by a change server.

10. The method of claim 1 wherein the database maintenance requirements include postponing maintenance based on low change activity.

11. The method of claim 1 wherein the database maintenance requirements include accelerating maintenance based on high change activity.

12. The method of claim 1 wherein the act of analyzing is used to optimize maintenance by minimizing time the one or more databases are taken off-line.

13. The method of claim 1 wherein the act of analyzing is used to predict future maintenance requirements.

14. A computer readable medium containing instructions stored thereon to instruct a processor to perform the method of claim 1.

15. The method of claim 1 further comprising:
    storing the metrics for later analysis; and
    analyzing the stored one or more metrics to determine database design changes for optimal use of the one or more databases.

16. A method comprising:
    creating one or more change maps related to activity in a database;
    monitoring changes to a database via internal database logging exit functions using a portal to a logger component of the database by accumulating the changes to the database in a cache;
    updating the one or more change maps based on the accumulated monitored changes from the cache upon an occurrence of an event;
    determining, using a processor, database maintenance requirements from the one or more change maps to identify recommended database actions by comparing information in the change maps to pre-defined thresholds set in a trigger file including an analysis based on monitored changes since a previous determination and cumulative monitored changes since a previous database initialization or reorganization to determine when to perform one or more database utilities related to the recommended database actions; and
    publishing information about the database maintenance requirements.

17. The method of claim 16 wherein the act of publishing further comprises presenting one or more recommended actions to a database administrator.

18. The method of claim 16 wherein the act of publishing further comprises informing another process to automatically perform one or more recommended actions.

19. The method of claim 16 wherein the act of monitoring is performed in real-time.

20. The method of claim 16 wherein the act of monitoring is performed in near real-time.

21. The method of claim 16 wherein the act of monitoring comprises recording the monitored changes in a buffer until a threshold is reached prior to performing analysis by a change server.

22. The method of claim 16, wherein the act of determining is performed by a change server process.

23. The method of claim 16 wherein the act of determining comprises postponing maintenance based on a low change activity.

24. The method of claim 16 wherein the act of determining includes accelerating maintenance based on a high change activity.

25. The method of claim 16 wherein the act of determining is used to optimize maintenance by minimizing time the one or more databases are taken off-line.

26. The method of claim 16 further comprising:
storing the monitored changes for later analysis; and
predicting future maintenance requirements based on the stored changes.

27. The method of claim 16 further comprising:
storing the monitored changes for later analysis; and
analyzing the stored changes to determine database design changes for optimal use of the one or more databases.

28. A computer readable medium containing instructions stored thereon to instruct a processor to perform the method of claim 16.

* * * * *

UNITED STATES PATENT AND TRADEMARK OFFICE
CERTIFICATE OF CORRECTION

| | | |
|---|---|---|
| PATENT NO. | : 8,190,579 B2 | Page 1 of 1 |
| APPLICATION NO. | : 12/134639 | |
| DATED | : May 29, 2012 | |
| INVENTOR(S) | : Ed Breaux et al. | |

It is certified that error appears in the above-identified patent and that said Letters Patent is hereby corrected as shown below:

In column 6, line 34, in claim 13, after "future" insert -- database --.

Signed and Sealed this
Twenty-fourth Day of July, 2012

David J. Kappos
*Director of the United States Patent and Trademark Office*